US012603790B2

(12) United States Patent
Jiang et al.

(10) Patent No.: US 12,603,790 B2
(45) Date of Patent: Apr. 14, 2026

(54) CYBER SECURITY AUTHENTICATION METHOD FOR NON-INTERNET ELECTRONIC DEVICE

(71) Applicant: EverMore Technology Inc., Hsinchu City (TW)

(72) Inventors: Jia-You Jiang, Hsinchu City (TW); Tsu-Pin Weng, Hsinchu City (TW); Yuan-Sheng Chen, Hsinchu City (TW); Jung-Hua Lo, Hsinchu City (TW); Yin-Te Tsai, Hsinchu City (TW); Wen-Hsing Kuo, Hsinchu City (TW); Ming-Feng Lu, Hsinchu City (TW)

(73) Assignee: EverMore Technology Inc., Hsinchu (TW)

( * ) Notice: Subject to any disclaimer, the term of this patent is extended or adjusted under 35 U.S.C. 154(b) by 188 days.

(21) Appl. No.: 18/678,735

(22) Filed: May 30, 2024

(65) Prior Publication Data

US 2025/0038998 A1 Jan. 30, 2025

(30) Foreign Application Priority Data

Jul. 27, 2023 (TW) .................................. 112128242

(51) Int. Cl.
*H04L 9/32* (2006.01)
*H04L 9/08* (2006.01)
(52) U.S. Cl.
CPC .......... *H04L 9/3268* (2013.01); *H04L 9/0869* (2013.01); *H04L 9/3213* (2013.01); *H04L 9/3247* (2013.01)

(58) Field of Classification Search
CPC .... H04L 9/3268; H04L 9/3213; H04L 9/3247
See application file for complete search history.

(56) References Cited

U.S. PATENT DOCUMENTS

2024/0267224 A1* 8/2024 Chen ..................... H04L 9/0863
2024/0405983 A1* 12/2024 Jiang ..................... H04L 9/088

* cited by examiner

*Primary Examiner* — Luu T Pham
*Assistant Examiner* — Paul J Skwierawski
(74) *Attorney, Agent, or Firm* — Demian K. Jackson; Jackson IPG PLLC

(57) ABSTRACT

The present invention relates to a cyber security authentication method. The method includes the following steps: in a user device: randomly generating an ephemeral decryption key, transmitting the ephemeral decryption key to a security server, and retrieving a key index from the security server; encrypting an identity information based on a part of the ephemeral decryption key to generate an electronic digital signature and an authentication token; and combining the key index, the electronic digital signature, and the authentication token to form an ephemeral certificate and transmitting the ephemeral certificate to a non-Internet electronic device; and in the non-Internet electronic device: parsing the ephemeral certificate to obtain the key index; and forwarding the key index to the security server via a transport connection including the user device to retrieve the ephemeral decryption key from the security server based on the key index.

9 Claims, 5 Drawing Sheets

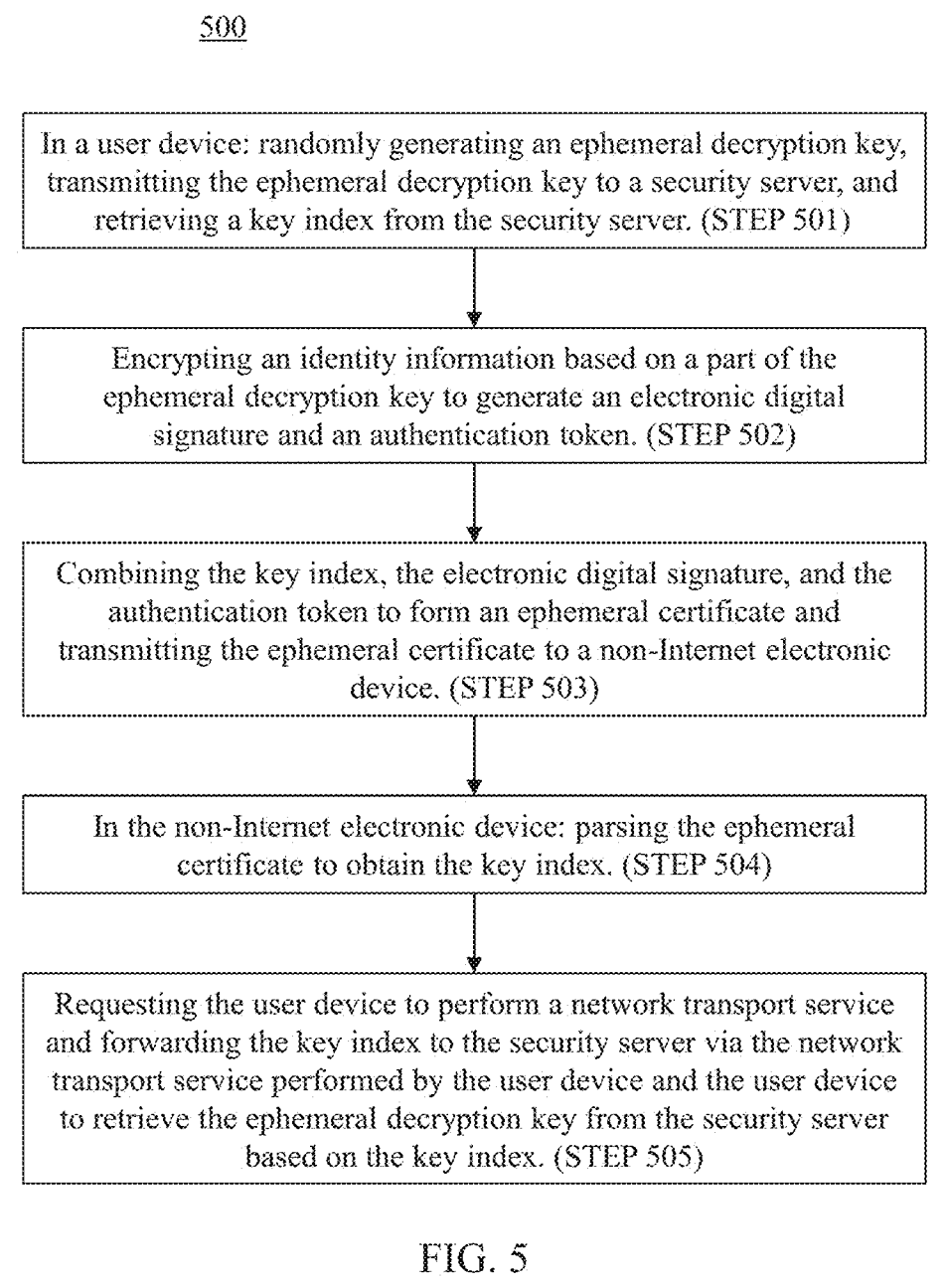

500

In a user device: randomly generating an ephemeral decryption key, transmitting the ephemeral decryption key to a security server, and retrieving a key index from the security server. (STEP 501)

Encrypting an identity information based on a part of the ephemeral decryption key to generate an electronic digital signature and an authentication token. (STEP 502)

Combining the key index, the electronic digital signature, and the authentication token to form an ephemeral certificate and transmitting the ephemeral certificate to a non-Internet electronic device. (STEP 503)

In the non-Internet electronic device: parsing the ephemeral certificate to obtain the key index. (STEP 504)

Requesting the user device to perform a network transport service and forwarding the key index to the security server via the network transport service performed by the user device and the user device to retrieve the ephemeral decryption key from the security server based on the key index. (STEP 505)

FIG. 5

CYBER SECURITY AUTHENTICATION METHOD FOR NON-INTERNET ELECTRONIC DEVICE

CROSS-REFERENCE TO RELATED APPLICATION

This application claims priority benefit to Taiwan Invention Patent Application No. 112128242, filed on Jul. 27, 2023, in Taiwan Intellectual Property Office, the entire disclosures of which are incorporated by reference herein.

FIELD

The present invention relates to a cyber security authentication method for non-Internet electronic device, in particular to a cyber security authentication method enabling a non-Internet electronic device to perform a third party cloud identity authentication through using a network transport service, so as to provide a cyber security protection service for the non-Internet electronic device incapable of connecting to the Internet.

BACKGROUND

In conventional technology, the non-Internet electronic devices, such as, local area network (LAN) devices, personal area network (PAN) devices, and Intranet devices, are not connected to the Internet. As these electronic devices are not connected to the Internet, they usually do not perform any identity security authentication or verification, nor are they equipped to strong encrypt and/or strong decrypt the transmitted contents during the communication process. Therefore, these electronic devices have relatively poor performance in terms of cyber security.

Most commonly-seen non-Internet electronic devices cover battery-powered low-power PAN devices, such as, various Bluetooth devices; devices that are limited to operate within a local area network (LAN) and do not have a built-in display, such as, printers and Network Attached Storage (NAS) devices; and Intranet devices that operate only in the internal field, such as, private surveillance cameras and internal servers.

Since these devices do not connect to the Internet, the ability to connect to the Internet or a wide area network (WAN) is not a design option in their original hardware design. As a result, these devices cannot perform identity security authentication or verification through methods such as cloud authentication. In addition, since these devices are only used for internal data transmission and only internal users have access rights, they are generally considered to be exposed to a relatively secure network environment, and therefore cyber security is usually not a primary consideration in their design process.

In addition, since these devices have a simple and single function and are used only in relatively secure areas, the hardware performance, including computing power, communication capability, and data storage capacity, of these devices is very limited and not sufficient enough to support cyber security tasks such as identity security authentication and communications strong encryption and decryption. Incorporating these cyber security tasks into the design can increase the complexity and cost of the hardware, which may also be against the primary design considerations for these devices.

Thus, in terms of cyber security, these non-Internet electronic devices are in fact not secure 'enough', and there are many cyber security vulnerabilities. For example, any unauthenticated third party can freely use a Bluetooth device that belongs to a particular person because the Bluetooth device lacks the identity authentication security mechanisms. Anyone can use special equipment to monitor the communication content between Bluetooth communication devices and illegally acquire the information, or perform other malicious operations on these Bluetooth devices, because these Bluetooth devices do not strong encrypt or decrypt the communication. As such, even a Bluetooth car door lock has security vulnerabilities that a hacker can manipulate to unlock the car door, enter the car, and then drive it away.

Note that for an encryption/decryption method to qualify as 'strong', its shared-key key-agreement procedure needs to be as strong or stronger than qualified key-exchange methods such as Elliptic Curve Diffie-Hellman Key Exchange (ECDH-KE) and its encryption/decryption algorithm needs to be benchmarked to be as strong or stronger than currently accepted standards such as AES256 in the GCM mode. Furthermore, if the security strength bar is raised further to post-quantum level then even ECDH-KE requires an upgrade. Just to cite as a counter-example, a key-agreement procedure that relies on password-hashing for shared-key derivation is a weak method that had been shown to be fatally insecure.

Hence, there is a need to solve the above deficiencies/issues.

SUMMARY

The present invention relates to a cyber security authentication method for a non-Internet electronic device, in particular to a cyber security authentication method enabling a non-Internet electronic device to perform a third party cloud identity authentication through using a network transport service, so as to provide a cyber security protection service for the non-Internet electronic device incapable of connecting to the Internet by itself.

Accordingly, the present invention provides a cyber security authentication method. The method includes the steps of: in a user device: randomly generating an ephemeral decryption key, transmitting the ephemeral decryption key to a security server, and retrieving a key index from the security server; encrypting an identity information based on a part of the ephemeral decryption key to generate an electronic digital signature and an authentication token; and combining the key index, the electronic digital signature, and the authentication token to form an ephemeral certificate and transmitting the ephemeral certificate to a non-Internet electronic device; and in the non-Internet electronic device: parsing the ephemeral certificate to obtain the key index; and forwarding the key index to the security server via a transport connection including the user device to retrieve the ephemeral decryption key from the security server based on the key index.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein:

FIG. 5 is a flow chart illustrating multiple implementation steps for implementing the cyber security authentication method for non-Internet electronic device according to the present invention.

DETAILED DESCRIPTION

Figure 1:
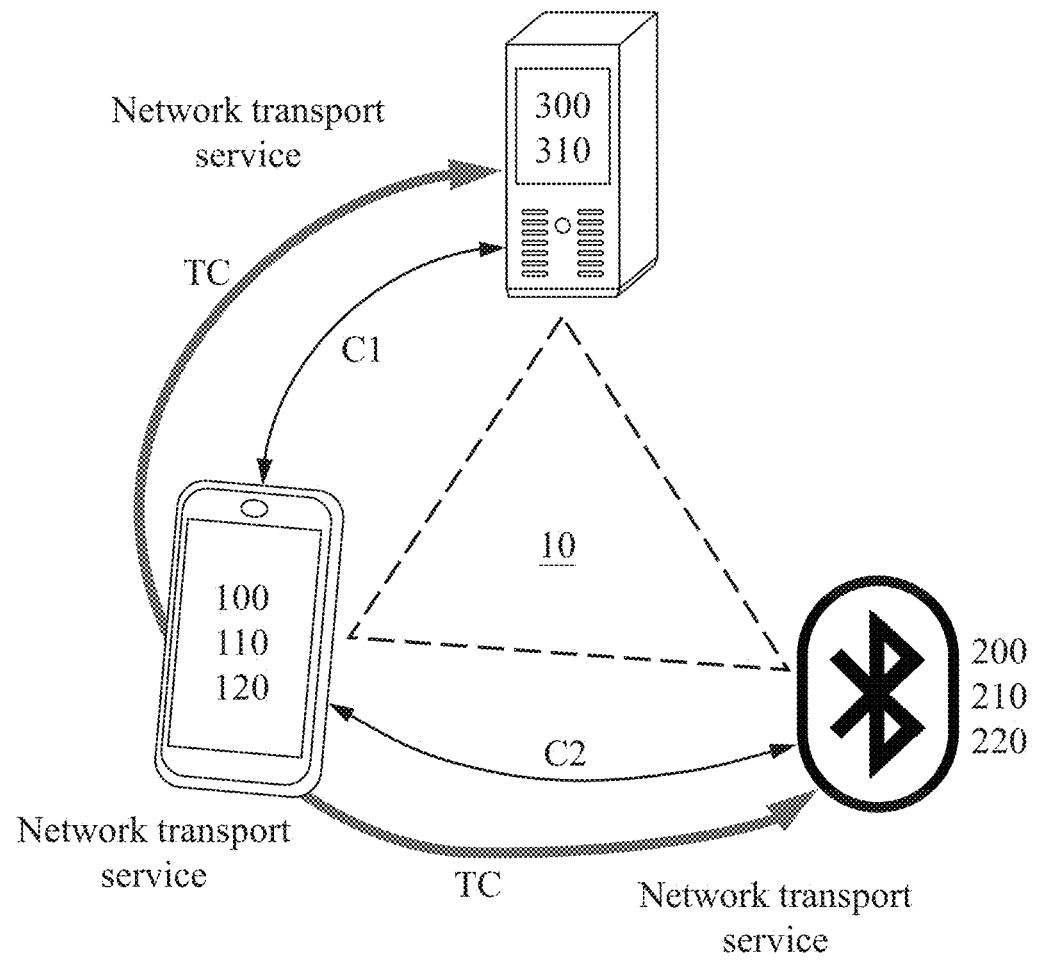
FIG. 1 is a schematic diagram illustrating a system architecture of a cyber security authentication system for non-Internet electronic device according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn to scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a schematic diagram illustrating a system architecture of a cyber security authentication system for a non-Internet electronic device according to the present invention. In this embodiment, the cyber security authentication system for non-Internet electronic device 10 includes at least a user device 100 operated by a user, a non-Internet electronic device 200, and a security server 300. A communication link and a transmission connection are established between the user device 100 and the security server 300 through the network, including the Internet and the Intranet, for data transmission and communication. However, the non-Internet electronic device 200 needs only to communicate authentication information and other data with the user device 100, independent of whether the non-Internet device 200 has any further means of direct network communication such as through WiFi. This clarification is to allow some hybrid devices that are equipped with both non-Internet means and Internet means of communication to benefit from the present invention, for example, to enable secure provisioning of the WiFi access-point SSID password (to set up a direct Internet connection after all) through the non-Internet Bluetooth port by the user device 100.

A non-Internet electronic device 200 is an electronic device that is incapable of connecting to the Internet or a wide area network (WAN), but can only connect to a local area network (LAN), a personal area network (PAN), or an Intranet. Such non-Internet electronic devices 200 can only operate and communicate within a home network, a local area network, or an Intranet, and is incapable of connecting to and communicating with an external network. The non-Internet electronic device 200 includes, but is not limited to, a local area network (LAN) device, a personal area network (PAN) device, an internal network device, an offline device, a non-Internet-enabled electronic device, an offline equipment, and an Internet-incapable electronic device, etc.

The non-Internet electronic device 200 lacks necessary hardware or chipsets inside that are capable of accessing an HTTP protocol, an HTTPS protocol, a TCP/IP protocol, or other protocols that provide access to the Internet or the wide area network. Therefore, the non-Internet electronic device 200 fails to connect to the Internet or the wide area network.

For example, the non-Internet electronic device 200 includes, but are not limited to, a Bluetooth device, a printer, a network attached storage (NAS) media, a wireless keyboard, a wireless mouse, a smart door lock, a smart car lock, a smart bracelet, a smart home controller (SHC), a point of sale, a point of service, a multimedia information terminal (Kiosk), a private surveillance camera, an internal server, and so on. Since the non-Internet electronic device 200 per se does not have the ability to connect to the Internet or WAN, it fails to authenticate the identity of the device and the user requesting the connection.

The user device 100 is preferably, for example, but not limited to, a desktop computer, a laptop computer, a tablet device, or a smartphone, etc. The security server 300 is a third-party intermediary security device, which is constructed and provided by a third-party cyber security service provider. The security server 300 is preferably, for example but not limited to, a security intermediary server or a cloud server.

In this embodiment, the user device is preferably a smartphone, the security server 300 is preferably a security intermediary server, and the non-Internet electronic device 200 is preferably a Bluetooth device. The communication transmission between the user device 100 and the security server 300 is made through a first transmission connection C1, and the communication transmission between the non-Internet electronic device 200 and the user device 100 is made through a second transmission connection C2. Since the non-Internet electronic device 200 is incapable of connecting to the Internet, the non-Internet electronic device 200 fails to connect directly to the security server 300.

In this embodiment, the non-Internet electronic device 200 is configured to request a user device 100 between the non-Internet electronic device 200 and the security server 300 to perform a network transport service, to request the user device 100 to act as a communication relay point between the non-Internet electronic device 200 and the security server 300 to forward the information sent from the non-Internet electronic device 200 to the security server 300, and to forward the information sent from the security server 300 to the non-Internet electronic device 200 so as to establish an independent transport connection TC between the non-Internet electronic device 200 and the security server 300. According to the protocols defined in the network transport service, the user device 100 does not have the authority to actively intervene to modify or block the digital packets sent by the non-Internet electronic device 200 or the security server 300 as the role of the user device 100 with respect to the transport connection TC is defined to be purely of a two-way relay messenger of encrypted information packets.

Figure 2:
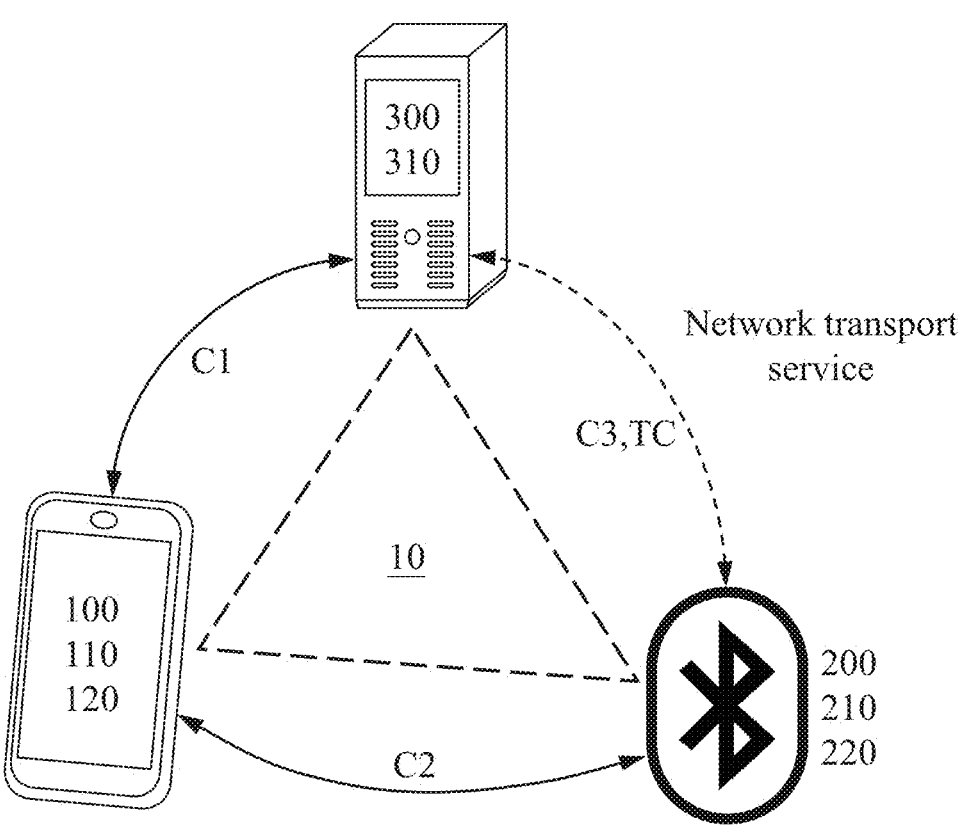
FIG. 2 is a schematic diagram illustrating a first embodiment for a three-party transmission relationship formed by a user device, a non-Internet electronic device, and a security server according to the present invention.

FIG. 2 is a schematic diagram illustrating a three-party transmission relationship formed by a user device, a non-Internet electronic device, and a security server according to the present invention. After the transport connection TC is successfully established, the transport connection TC is considered as a third-party independent transmission connection C3 between the non-Internet electronic device 200 and the security server 300. Therefore, a triangular three-party transmission connection relationship is formed among the user device 100, the non-Internet electronic device 200, and the security server 300, as shown in FIG. 2.

The cyber security authentication method for the non-Internet electronic device according to the present invention is practically implemented in the form of, for example, but not limited to, an application, an agent, or a service program. These programs are preinstalled and executed on the user device 100, the non-Internet electronic device 200, and the security server 300, respectively. In this embodiment, a first service programming module 110, a second service programming module 210, and a third service programming module 310 are installed in the user device 100, the non-Internet electronic device 200, and the security server 300, respectively, to implement a multi-party multi-factor dynamic strong encryption authentication across the user device 100, the non-Internet electronic device 200, and the security server 300, to provide user authentication by an independent and secure third party, such as the security server 300, for the non-Internet electronic device 200 to reject connection requests from unauthorized users, and to enhance network transmission security and cyber security protection for the non-Internet electronic device 200.

Figure 3:
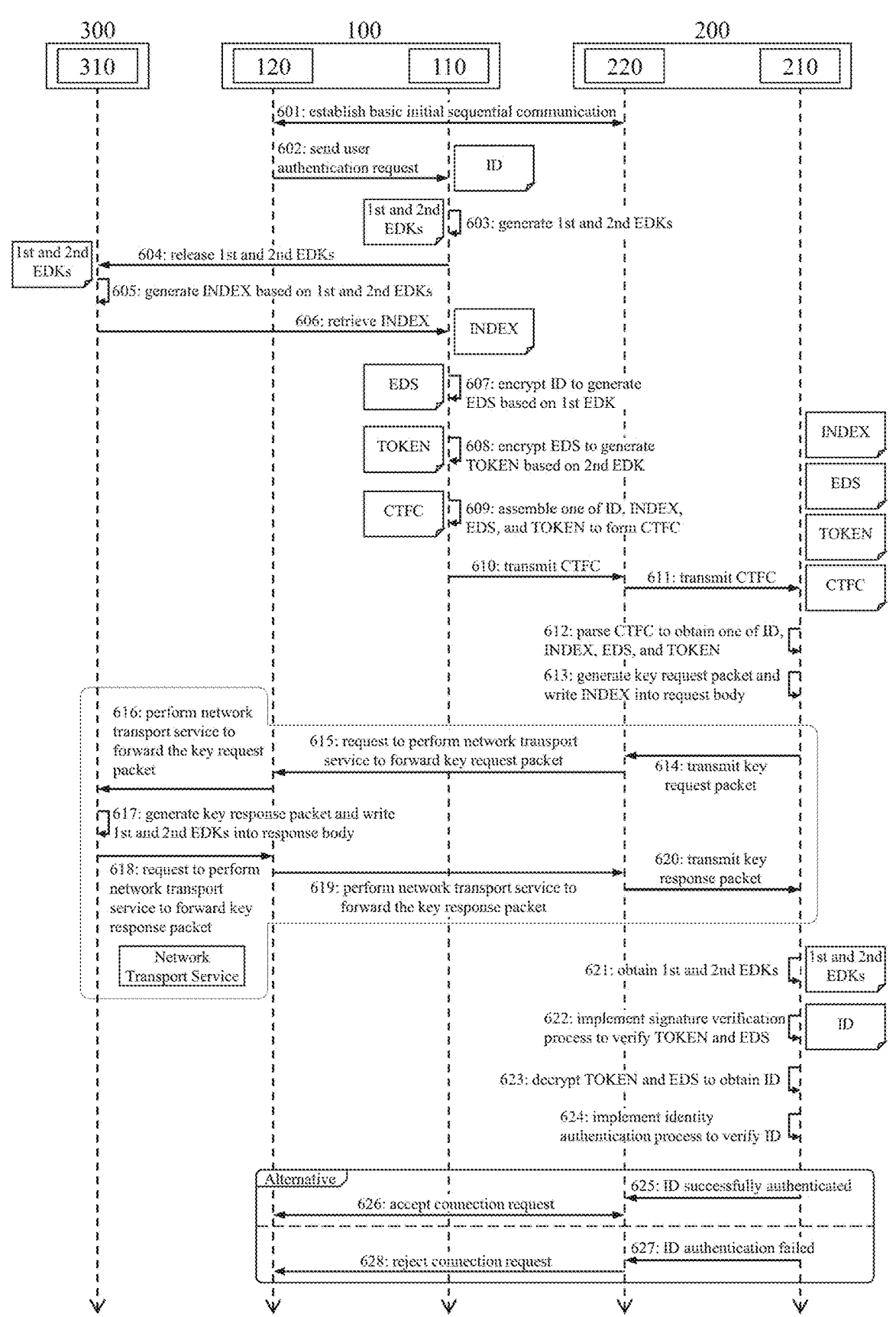
FIG. 3 is a sequence diagram illustrating the implementation processes for the cyber security authentication method for non-Internet electronic device according to the present invention.

FIG. 3 is a sequence diagram illustrating the implementation processes for the cyber security authentication method for non-Internet electronic device according to the present invention. In this embodiment, the user device 100 and the non-Internet electronic device 200 further include a network transport service programming module 120 and a peripheral service programming module 220, respectively. The cyber security authentication method for non-Internet electronic device according to the present invention is implemented based on the cyber security authentication system for non-Internet electronic device 10, and includes multiple steps that are sequentially performed as follows.

STEP 601: Since it is preferable to pre-verify the user's identity before the actual transmission connection is established between the non-Internet electronic device 200 and the user device 100, in order to execute the cyber security authentication method for non-Internet electronic device between the non-Internet electronic device 200 and the user device 100 to verify the user's identity, the network transport service programming module 120 and the peripheral service programming module 220 are performed to establish a basic initial sequential communication between the user device 100 and the non-Internet electronic device 200. The sequential communication is a direct connection that occurs between the devices, and does not involve the connections to the Internet or the wide area network (WAN).

STEP 602: After the initial sequential communication is successfully established, a user authentication request is sent from the network transport service programming module 120 to the first service programming module 110 to request the first service programming module 110 to perform the user identity authentication to authenticate that the user is an authorized user who has been previously registered or bound.

STEP 603: After the first service programming module 110 successfully receives the user authentication request, the first service programming module 110 is configured to generate, for example, but not limited to, a first ephemeral decryption key (1st EDK) having a length of 32 bytes by a randomized scheme or by implementing a first cryptographic algorithm. Next, the first service programming module 110 is configured to generate a second ephemeral decryption key (2nd EDK) by a randomized manner scheme or by varying the first ephemeral decryption key based on the first ephemeral decryption key by a scrambling manner scheme.

For example, the first service programming module 110 may be configured to implement a scrambling process to generate a second ephemeral decryption key based on the first ephemeral decryption key by varying the first ephemeral decryption key. The form of the first and second ephemeral decryption keys is not limited. For example, the second ephemeral decryption key is preferably a symbol string of 256 bytes in length.

The first cryptographic algorithm is preferably selected from an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, and a combination thereof. The first cryptographic algorithm is preferably applied to generate an ephemeral decryption key, also known as a hash or hash encryption algorithm.

STEP 604: Next, the first service programming module 110 is configured to release the generated first and second ephemeral decryption keys from the user device 100 to the security server 300.

STEP 605: The third service programming module 310 running on the security server 300 is configured to extract a key index (INDEX) based on the received first and second ephemeral decryption keys. The key index refers to the least content or strictly smaller portion that is sufficient to extract the information of the first and second ephemeral decryption keys.

STEP 606: After the third service programming module 310 successfully generates the key index, the first service programming module 110 is configured to retrieve the key index from the third service programming module 310.

STEP 607: Next, the first service programming module 110 is configured to implement a public key infrastructure (PKI) method or a second cryptographic algorithm based on the first ephemeral decryption key to encrypt the identity information (ID) that is assigned and bound to the user device 100 to generate an electronic digital signature (EDS). The second cryptographic algorithm is preferably applied to generate the electronic digital signature. The second cryptographic algorithm is preferably selected from an RSA algorithm, a DSA algorithm, an ECDSA algorithm, an ECC algorithm, a HMAC algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34. 11-94 algorithm, a BLAKE2 algorithm, a Whirlpool algorithm, an SM3 algorithm, and a combination thereof.

STEP 608: Next, the first service programming module 110 is configured to further implement a third cryptographic algorithm, preferably a symmetric encryption algorithm, based on the second ephemeral decryption key to further encrypt at least the electronic digital signature into an authentication token (TOKEN). The third cryptographic algorithm is preferably selected from an AES algorithm, a HMAC algorithm, an MD5 algorithm, an MD4 algorithm, an MD2 algorithm, an SHA-1 algorithm, an SHA-2 algorithm, an SHA-3 algorithm, a Blowfish algorithm, a Camellia algorithm, a Chacha20 algorithm, a Poly 1305 algorithm, a SEED algorithm, a CAST-128 algorithm, a DES algorithm, an IDEA algorithm, an RC2 algorithm, an RC4 algorithm, an RC5 algorithm, an SM4 algorithm, a TDES algorithm, and a GOST 28147-89 algorithm, and a combination thereof.

STEP 609: Next, the first service programming module 110 is configured to assemble one of the identity information, the key index, the electronic digital signature, and the authentication token to form an ephemeral certificate (CTFC).

STEP 610: Then, the first service programming module 110 is configured to transmit the ephemeral certificate to the peripheral service programming module 220 executed on the non-Internet electronic device 200.

STEP 611: Then, the peripheral service programming module 220 is configured to forward the ephemeral certificate to the second service programming module 210 executed on the non-Internet electronic device 200.

STEP 612: When the second service programming module 210 acknowledges that the ephemeral certificate has been successfully received, it first verifies that the received ephemeral certificate complies with the ephemeral certificate encoding rule to verify the authenticity of the ephemeral certificate, for example, to verify that the ephemeral certificate has not been tampered with during transmission. After the second service programming module 210 confirms that the ephemeral certificate is true, it parses the ephemeral certificate to obtain the identity information, the key index, the electronic digital signature, or the authentication token.

STEP 613: Next, the second service programming module 210 is used as the client end. The second service programming module 210 is configured to generate a key request packet according to the request-response rule by the HTTP protocol to request to retrieve a key from the security server 300, and write a key fetch instruction and a key index into a request body of the request packet to form the key request packet accordingly.

STEP 614: If the key request packet is successfully generated, the second service programming module 210 is configured to transmit the key request packet to the peripheral service programming module 220.

STEP 615: Next, the peripheral service programming module 220 is configured to request the network transport service programming module 120 to perform the network transport service to forward the key request packet to the third service programming module 310 through the network transport service programming module 120.

STEP 616: Next, the network transport service programming module 120 is configured to perform the network transport service to forward the key request packet to the third service programming module 310 by the user device 100.

STEP 617: After successfully receiving the key request packet, the third service programming module 310 is configured to read the key fetch instruction and the key index stored in the request body, generate a corresponding key response packet, and then extract the first and second ephemeral decryption key information based on the key index. Then, the third service programming module 310 is configured to write the first and second ephemeral decryption keys into the response body and generate the key response packet accordingly.

STEP 618: When the key response packet is successfully generated, the third service programming module 310 is configured to request the network transport service programming module 120 to perform the network transport service to forward the key response packet from the network transport service programming module 120 to the peripheral service programming module 220.

STEP 619: The network transport service programming module 120 is configured to perform the network transport service and forward the key response packet through the user device 100 to the peripheral service programming module 220.

STEP 620: When the peripheral service programming module 220 acknowledges that the key response packet has been successfully received, the peripheral service programming module 220 then transmits the key response packet to the second service programming module 210.

STEP 621: After acknowledging that the key response packet was successfully received, the second service programming module 210 is configured to read the first and second ephemeral decryption keys to obtain the first and second ephemeral decryption keys.

STEP 622: After the identity information is successfully obtained, the second service programming module 210 continues to implement a signature verification process based on the first ephemeral decryption key to verify that the received electronic digital signature and the authentication token have not been tampered with and are correctly signed.

STEP 623: After the second service programming module 210 confirms that the received electronic digital signature and the authentication token are correctly signed, the second service programming module 210 is configured to implement the second and third cryptographic algorithms based on the first and second ephemeral decryption keys to decrypt the authentication token and the electronic digital signature, respectively, to obtain the identity information.

STEP 624: Next, the peripheral service programming module 220 is configured to implement an identity authentication process to verify whether the obtained identity information correctly matches the record.

STEP 625: After the second service programming module 210 confirms that the obtained identity information correctly matches the record and is successfully authenticated, it is configured to issue a connection authorization notification and send it to the peripheral service programming module 220. Based on the received connection authorization notification, the peripheral service programming module 220 obtains permission to establish a transmission connection with the user device 100.

STEP 626: According to the connection authorization notification, the peripheral service programming module 220 is configured to accept a connection request from the user device 100 and establish a transmission connection with the user device 100.

STEP 627: If the second service programming module 210 determines that the obtained identity information does not match the record, it is configured to generate and send a connection rejection notification to the peripheral service programming module 220, and instruct the peripheral service programming module 220 to reject the connection request from the user device 100.

STEP 628: According to the connection authorization notification, the peripheral service programming module 220 is configured to reject the connection request from the user device 100.

After the execution of the signature verification process and the identity authentication process is completed, the first and second ephemeral decryption keys temporarily stored in the user device 100, the non-Internet electronic device 200, and the security server 300, and the electronic digital signature, the authentication token, the key index, and the ephemeral certificate temporarily stored in the user device 100 and the non-Internet electronic device 200 are all automatically deleted.

Figure 4:
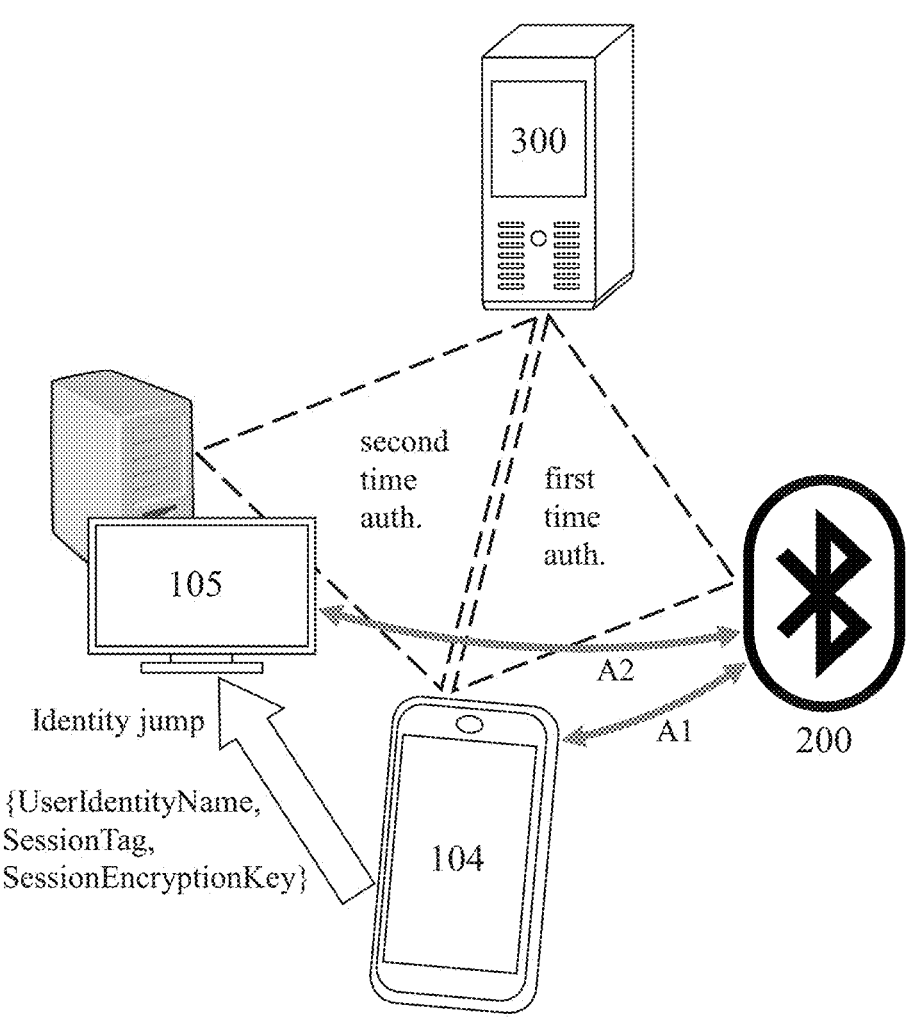
FIG. 4 is a schematic diagram illustrating a second embodiment for a twice-time three-party transmission relationship formed by a first user device, a second user device, a non-Internet electronic device, and a security server according to the present invention.

FIG. 4 is a schematic diagram illustrating a second embodiment for a twice-time three-party transmission relationship formed by a first user device, a second user device, a non-Internet electronic device, and a security server according to the present invention. This embodiment is a 'double-decker' embodiment with two user devices which are the first user device 104 and the second user device 105, where the first user device 104 is preferably a smartphone provisioned with the identity of a real world user/person, and the second user device 105 is preferably a PC provisioned with the identity of a home or workstation computer device, both identities are registered within the scheme and credentials database of the security server 300.

Common among the first user device 104, the second user device 105, and the non-Internet electronic device 200 is a non-Internet communications channel/transport, such as for example legacy Bluetooth or Bluetooth Low Energy, that freely allows peer-to-peer pairwise connections between device 104 and device 105, device 104 and device 200, and lastly, between device 105 and device 200.

When twice applying the present invention's authentication flow, first time authentication with the three-party transmission relationship among the first user device 104, the non-Internet electronic device 200, and the security server 300, and the second time authentication with the three-party transmission relationship among the first user device 104, the second user device 105, and the security server 300, culminating in a succinct data representation of such a transient session as a three-tuple {UserIdentityName, SessionTag, SessionEncryptionKey} would eventually enable the second user device 105 to successfully establish an authenticated, albeit proxied, non-Internet connection with the non-Internet electronic device 200 bearing the Identity of the real-world person that was originally provisioned and bound to the first user device 104.

This is of significance because the non-Internet electronic device 200 possibly keeps within its whitelist of authorized connections only the real-world person which is the first user device 104, such as a smartphone, but not the second user device 105, such as a PC, while the real-world person desires to work on the PC for control/access of the non-Internet electronic device 200. The non-Internet electronic device 200 connects to the first user device 104 via the first authenticated connection A1.

In summary, this embodiment enables a real-world person Identity operating the first user device 104 to 'jump' or 'transfer' his/her Identity to the second user device 105 and for the second user device 105 to connect securely to the non-Internet electronic device 200 via a second authenticated connection A2. Note that such Identity-jump is accomplished without leaking any part of the user's Identity keys to the second user device 105.

FIG. 5 is a flow chart illustrating multiple implementation steps for implementing the cyber security authentication method for non-Internet electronic device according to the present invention. In summary, the cyber security authentication method for non-Internet electronic device 500 according to the present invention preferably includes, but is not limited to, the following implementation steps: in a user device: randomly generating an ephemeral decryption key, transmitting the ephemeral decryption key to a security server, and retrieving a key index from the security server (STEP 501); encrypting an identity information based on a part of the ephemeral decryption key to generate an electronic digital signature and an authentication token (STEP 502); combining the key index, the electronic digital signature, and the authentication token to form an ephemeral certificate and transmitting the ephemeral certificate to a non-Internet electronic device (STEP 503); in the non-Internet electronic device: parsing the ephemeral certificate to obtain the key index (STEP 504); and requesting the user device to perform a network transport service and forwarding the key index to the security server via the network transport service performed by the user device and the user device to retrieve the ephemeral decryption key from the security server based on the key index (STEP 505).

Embodiment 1: A cyber security authentication method includes: in a user device: randomly generating an ephemeral decryption key, transmitting the ephemeral decryption key to a security server, and retrieving a key index from the security server; encrypting an identity information based on a part of the ephemeral decryption key to generate an electronic digital signature and an authentication token; and combining the key index, the electronic digital signature, and the authentication token to form an ephemeral certificate and transmitting the ephemeral certificate to a non-Internet electronic device; and in the non-Internet electronic device: parsing the ephemeral certificate to obtain the key index; and forwarding the key index to the security server via a transport connection including the user device to retrieve the ephemeral decryption key from the security server based on the key index.

Embodiment 2: The cyber security authentication method according to Embodiment 1 further includes one of the following steps: in the non-Internet electronic device: generating a request packet, and writing the key index into a request body of the request packet; and requesting the user device to perform a network transport service and forwarding the request packet to the security server via the user device; and in the security server: receiving the request packet; generating a response packet, and writing the ephemeral decryption key into the response body of the response packet; and requesting the user device to perform the network transport service and forwarding the response packet to the non-Internet electronic device.

Embodiment 3: The cyber security authentication method according to Embodiment 1 further includes one of the following steps: in the non-Internet electronic device: requesting the user device to perform a network transport service to establish the transport connection and forwarding the key index to the security server via the user device to retrieve the ephemeral decryption key based on the key index; parsing the ephemeral certificate to obtain the key index, the electronic digital signature, and the authentication token; decrypting the authentication token based on a second part of the ephemeral decryption key to obtain the electronic digital signature; decrypting the electronic digital signature based on a first part of the ephemeral decryption key to obtain the identity information; implementing a signature verification process to verify whether the electronic digital signature is correctly signed; implementing an identity authentication process to verify whether the identity information is correctly matched to the record if the electronic digital signature is correctly signed; and accepting a connection request from the user device if the verification results of the signature verification process and the identity authentication process are correct, otherwise rejecting the connection request.

Embodiment 4: The cyber security authentication method according to Embodiment 3 further includes one of the following steps: in the user device, the non-Internet electronic device, and the security server: after both the signature and the identity authentication processes are completed, deleting the ephemeral decryption key stored on the user device, the non-Internet electronic device, and the security server; and in the non-Internet electronic device and the security server: after both the signature and the identity authentication processes are completed, deleting the electronic digital signature, the authentication token, the key index, and the ephemeral certificate stored on the non-Internet electronic device and the security server.

Embodiment 5: The cyber security authentication method according to Embodiment 1 further includes one of the following: in the user device: randomly generating a first ephemeral decryption key and a second ephemeral decryption key; selectively implementing a scrambling process to generate a second ephemeral decryption key based on a part of the first ephemeral decryption key; encrypting the identity information using a second cryptographic method based on the first ephemeral decryption key to generate the electronic digital signature; encrypting the electronic digital signature using a third cryptographic method based on the second ephemeral decryption key to generate the authentication token; and releasing the first ephemeral decryption key and the second ephemeral decryption key to the security server, and retrieving the key index from the security server.

Embodiment 6: The cyber security authentication method according to Embodiment 5 further includes one of the following steps: in the non-Internet electronic device: parsing the ephemeral certificate to obtain the key index, the electronic digital signature, and the authentication token; decrypting the authentication token based on the second ephemeral decryption key to obtain the electronic digital signature; decrypting the electronic digital signature based on the first ephemeral decryption key to obtain the identity information; implementing a signature verification process to verify whether the electronic digital signature is correctly signed; implementing an identity authentication process to verify whether the identity information is correctly matched to the record if the electronic digital signature is correctly signed; and accepting a connection request from the user device if the verification results of the signature verification process and the identity authentication process are correct, otherwise rejecting the connection request.

Embodiment 7: The cyber security authentication method according to Embodiment 3, by executing the network transport service, an independent transport connection is established between the non-Internet electronic device and the security server via the user device, so as to fully establish the respective three transmission connections among the respective three parties including the security server, the user device, and the non-Internet electronic device.

Embodiment 8: The cyber security authentication method according to Embodiment 1, the user device is a smartphone, a tablet device, a laptop computer, or a desktop computer.

Embodiment 9: The cyber security authentication method according to Embodiment 1, the non-Internet electronic device is a Bluetooth device, a local area network device, a personal area network device, an internal network device, an offline device, or a non-Internet-enabled electronic device.

Embodiment 10: The cyber security authentication method according to Embodiment 1, the security server is a security intermediary server or a cloud server.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A cyber security authentication method, comprising:

in a user device:

randomly generating an ephemeral decryption key, transmitting the ephemeral decryption key to a security server, and retrieving a key index from the security server;

encrypting an identity information based on a part of the ephemeral decryption key to generate an electronic digital signature and an authentication token; and combining one of the key index, the electronic digital signature, and the authentication token to form an ephemeral certificate and transmitting the ephemeral certificate to a non-Internet electronic device; and in the non-Internet electronic device:

parsing the ephemeral certificate to obtain the key index; and forwarding the key index to the security server via a transport connection comprising the user device to retrieve the ephemeral decryption key from the security server based on the key index, wherein the cyber security authentication method further comprises one of the following steps:

in the non-Internet electronic device:

requesting the user device to perform a network transport service to establish the transport connection and forwarding the key index to the security server via the user device to retrieve the ephemeral decryption key based on the key index;

parsing the ephemeral certificate to obtain the key index, the electronic digital signature, and the authentication token;

decrypting the authentication token based on a second part of the ephemeral decryption key to obtain the electronic digital signature;

decrypting the electronic digital signature based on a first part of the ephemeral decryption key to obtain the identity information;

implementing a signature verification process to verify whether the electronic digital signature is correctly signed;

implementing an identity authentication process to verify whether the identity information is correctly matched to the record if the electronic digital signature is correctly signed; and accepting a connection request from the user device if the verification results of the signature verification process and the identity authentication process are correct, otherwise rejecting the connection request.

2. The cyber security authentication method according to claim 1, further comprising one of the following steps:

in the non-Internet electronic device:

generating a request packet, and writing the key index into a request body of the request packet; and requesting the user device to perform a network transport service and forwarding the request packet to the security server via the user device; and in the security server:

receiving the request packet;

generating a response packet, and writing the ephemeral decryption key into the response body of the response packet; and requesting the user device to perform the network transport service and forwarding the response packet to the non-Internet electronic device.

3. The cyber security authentication method according to claim 1, further comprising one of the following steps:

in the user device, the non-Internet electronic device, and the security server:

after both the signature and the identity authentication processes are completed, deleting the ephemeral decryption key stored on the user device, the non-Internet electronic device, and the security server; and in the non-Internet electronic device and the security server:

after both the signature and the identity authentication processes are completed, deleting the electronic digital signature, the authentication token, the key index, and the ephemeral certificate stored on the non-Internet electronic device and the security server.

4. The cyber security authentication method according to claim 1, further comprising one of the following:

in the user device:

randomly generating a first ephemeral decryption key and a second ephemeral decryption key;

selectively implementing a scrambling process to generate a second ephemeral decryption key based on a part of the first ephemeral decryption key;

encrypting the identity information using a second cryptographic method based on the first ephemeral decryption key to generate the electronic digital signature;

encrypting the electronic digital signature using a third cryptographic method based on the second ephemeral decryption key to generate the authentication token; and releasing the first ephemeral decryption key and the second ephemeral decryption key to the security server, and retrieving the key index from the security server.

5. The cyber security authentication method according to claim 4, further comprising one of the following steps:

in the non-Internet electronic device:

parsing the ephemeral certificate to obtain the key index, the electronic digital signature, and the authentication token;

decrypting the authentication token based on the second ephemeral decryption key to obtain the electronic digital signature;

decrypting the electronic digital signature based on the first ephemeral decryption key to obtain the identity information;

implementing a signature verification process to verify whether the electronic digital signature is correctly signed;

implementing an identity authentication process to verify whether the identity information is correctly matched to the record if the electronic digital signature is correctly signed; and accepting a connection request from the user device if the verification results of the signature verification process and the identity authentication process are correct, otherwise rejecting the connection request.

6. The cyber security authentication method according to claim 1, wherein by executing the network transport service, an independent transport connection is established between the non-Internet electronic device and the security server via the user device, so as to fully establish the respective three transmission connections among the respective three parties comprising the security server, the user device, and the non-Internet electronic device.

7. The cyber security authentication method according to claim 1, wherein the user device is a smartphone, a tablet device, a laptop computer, or a desktop computer.

8. The cyber security authentication method according to claim 1, wherein the non-Internet electronic device is a Bluetooth device, a local area network device, a personal area network device, an internal network device, an offline device, or a non-Internet-enabled electronic device, an offline equipment, or an Internet-incapable electronic device.

9. The cyber security authentication method according to claim 1, wherein the security server is a security intermediary server or a cloud server.

\* \* \* \* \*